United States Patent
Haikin et al.

(10) Patent No.: US 7,489,815 B2
(45) Date of Patent: Feb. 10, 2009

(54) SOURCE DEVICE TO DESTINATION DEVICE TRANSFORM USING BLACK WEIGHT

(75) Inventors: John S. Haikin, Fremont, CA (US); Todd D. Newman, Palo Alto, CA (US)

(73) Assignees: Canon Kabushiki Kaisha, Tokyo (JP); Microsoft Corporation, Redmond, WA (US)

( * ) Notice: Subject to any disclaimer, the term of this patent is extended or adjusted under 35 U.S.C. 154(b) by 0 days.

(21) Appl. No.: 11/039,492

(22) Filed: Jan. 18, 2005

(65) Prior Publication Data

US 2006/0159334 A1 Jul. 20, 2006

(51) Int. Cl.
*G06K 9/00* (2006.01)
*H04N 1/60* (2006.01)

(52) U.S. Cl. .................................... 382/167; 358/518
(58) Field of Classification Search ................. 382/167
See application file for complete search history.

(56) References Cited

U.S. PATENT DOCUMENTS

| | | | | |
|---|---|---|---|---|
| 5,077,604 A * | 12/1991 | Kivolowitz et al. | ......... | 358/520 |
| 5,398,121 A * | 3/1995 | Kowalewski et al. | ........ | 358/504 |
| 5,528,386 A * | 6/1996 | Rolleston et al. | ............ | 358/522 |
| 5,719,956 A * | 2/1998 | Ogatsu et al. | ................ | 382/167 |
| 5,774,238 A * | 6/1998 | Tsukada | ..................... | 358/529 |
| 5,987,168 A * | 11/1999 | Decker et al. | ................ | 382/167 |
| 6,061,501 A * | 5/2000 | Decker et al. | ................ | 358/1.9 |
| 6,118,550 A * | 9/2000 | Hayashi | ...................... | 358/296 |
| 6,137,594 A * | 10/2000 | Decker et al. | ................ | 358/1.9 |
| 6,281,984 B1 * | 8/2001 | Decker et al. | ................ | 358/1.9 |
| 6,313,925 B1 * | 11/2001 | Decker et al. | ................ | 358/1.9 |
| 6,362,808 B1 * | 3/2002 | Edge et al. | .................... | 345/601 |
| 6,396,595 B1 | 5/2002 | Shimazaki | ................... | 358/1.9 |
| 6,466,332 B1 * | 10/2002 | Fukasawa | .................... | 358/1.9 |
| 6,529,291 B1 | 3/2003 | Schweid | ...................... | 358/1.9 |
| 6,778,300 B1 | 8/2004 | Kohler | ........................ | 358/529 |
| 6,985,252 B1 | 1/2006 | Kubo | .......................... | 358/1.9 |
| 7,019,868 B2 | 3/2006 | Chang et al. | .................. | 358/2.1 |
| 7,295,703 B2 * | 11/2007 | Bala et al. | ..................... | 382/165 |
| 2002/0113982 A1 | 8/2002 | Chang et al. | .................. | 358/1.9 |
| 2002/0159081 A1 | 10/2002 | Zeng | .......................... | 358/1.9 |
| 2003/0072016 A1 | 4/2003 | Dalrymple et al. | ........... | 358/1.9 |
| 2004/0196475 A1 * | 10/2004 | Zeng et al. | .................... | 358/1.9 |

* cited by examiner

*Primary Examiner*—Wenpeng Chen
(74) *Attorney, Agent, or Firm*—Fitzpatrick, Cella, Harper & Scinto

(57) ABSTRACT

The present invention relates to a color management method for controlling the amount of black ink used by a destination device with a black channel when converting colors from one of a plurality of source device color spaces to destination device color space. This conversion is accomplished by obtaining a black weight of a source pixel in the source device color space, transforming the source pixel into a color in color appearance space, and calculating destination values based on the color in color appearance space and the obtained black weight. In the case that the source device color space does not include a black channel, the black weight is obtained from a color purity of the source pixel. In the case that the source device color space is a device space including a K channel, the black weight is obtained from the K channel.

29 Claims, 5 Drawing Sheets

SOURCE DEVICE TO DESTINATION DEVICE TRANSFORM USING BLACK WEIGHT

BACKGROUND OF THE INVENTION

1. Field of the Invention

The present invention relates to a color management method for the conversion of color in a source device color space to color values in a device space that includes a black channel, such as CMYK.

2. Description of the Related Art

Typically, color management systems utilize color transforms to convert colors from device-dependent to device-independent color spaces, and vice versa. This is beneficial because different devices display colors in different ways. For example, display devices often display colors as a mixture of red, green, and blue light (RGB), while printers will often utilize mixtures of cyan, magenta, yellow and black inks (CMYK) to print colors. It is beneficial to maintain color fidelity across these two different devices, so that an image displayed on a RGB display appears the same when it is printed on a CMYK printer. To maintain this color fidelity, the RGB values are converted into a device-independent color appearance space, and then the colors in the device-independent color space are converted to CMYK values. In this way, the colors can be accurately mapped and reproduced between different devices.

This mapping is typically achieved with color transforms. Conventionally, color transforms are created by measuring the output of a specific device at a plurality of known inputs. For example, a color transform for a CMYK printer can be computed by measuring color patches printed by the printer at a plurality of CMYK values. The measurements are taken by a color measuring device, such as a calorimeter or a spectrophotometer, and the measurements are in a device-independent color space, such as CIEXYZ, CIELab, CIECAM, or CIELuv. With these measurements, a color management system is able to predict what device-independent color a printer will produce at a specific value of CMYK.

However, color management systems ordinarily rely on a conversion in the reverse direction, from a three-dimensional device-independent color value to a four-dimensional CMYK device-dependent value, and this conversion is complicated by the additional degree of freedom provided in the black (K) channel. As with other color spaces having four or more color components, the CMYK space is underspecified. In other words, the same color can theoretically be produced using different amounts of black ink (K) with varying amounts of cyan, magenta, and yellow (CMY). Therefore, a one-to-one unique mapping from color appearance space to CMYK space is not mathematically possible, nor is even desirable since this underspecification provides flexibility in selecting ink values. However, this flexibility can lead to potentially unsatisfactory conversions, since certain levels of black ink may produce visually unsatisfactory colors. For instance, neutral colors, such as grays, typically look better with higher amounts of black ink, even though mathematically accurate conversions can be found with low amounts of black ink. On the other hand, saturated non-neutral colors appear sharper with lower amounts of black ink. As such, it may be desirable to reproduce the black ink characteristics of a source device in a CMYK device so that colors produced by the two devices appear more similar.

In addition, it may be desirable to control the amount of black ink for other reasons. For instance, it may be desirable to always use the most amount of black ink possible, as black ink is generally the least expensive. Alternatively, it may be beneficial to use less black ink and more colored ink, as this may improve the results in a color trapping process.

Attempts have been made to control the K level in conversions to CMYK device space, such as conversions from RGB device space or from another CMYK device space. However, these attempts have not satisfactorily addressed the problems associated with controlling the K level in a conversion from color appearance space to CMYK space. Other attempts have been made to treat the conversion of neutral and non-neutral color appearance space values differently, but have generally been unsatisfactory. Moreover, all such prior attempts do not adequately address the possibility that the source device space might be a device space (such as RGB) that does not include a black channel, or might be a device space (such as CMYK) that does.

U.S. patent application Ser. No. 10/841,184, filed on May 6, 2004, and U.S. patent application Ser. No. 10/953,705, filed on Sep. 28, 2004 describe methods for controlling the K value in conversions from internal color space to CMYK. While the methods described in these applications perform well for controlling the K level in such conversions, it would be beneficial to obtain a more accurate calculation of the amount of black ink used by a destination CMYK device while flexibly accommodating the possibility that the source device might or might not have a black channel.

SUMMARY OF THE INVENTION

To address the foregoing, the present invention transforms a color from one of a plurality of source device color spaces to a destination color space that includes a black channel by obtaining a black weight of the color in the source device color space, and using this black weight in calculating destination values for a destination device. For flexibility, the black weight is calculated from the source black channel if the source device includes a black channel, and from color purity of the source device color if it does not include a black channel.

Thus, according to one aspect of the invention, colors are converted from one of a plurality of source device color spaces to a destination color space that includes a black channel. The conversion includes obtaining a black weight of a source pixel in the source device color space. The black weight is obtained based on a black channel in the source color space if the source color space includes a black channel, and is obtained based on color purity if they source color space does not include a black channel. The source pixel is transformed into a color in color appearance space, and a destination color value is calculated based on the color in color appearance space and the obtained black weight.

By obtaining the black weight of a pixel in the source device color space and utilizing this black weight in the calculation of the destination color value, the present invention effectively uses the black weight in the source color space as a "hint" for the black channel in the destination space, and thus is able to more accurately reflect the amount of black used in the source device in the destination device. Moreover, since black weight is calculated even if the source does not include a black channel, the invention achieves flexibility in accommodating varied source spaces.

According to another aspect of the present invention, in the case that the type of the source device color space is a trichromatic color space, the black weight is obtained from a relative purity of the source pixel in the trichromatic color space.

According to still another aspect of the invention, in the case that the type of the source device color space is a device space including a K channel, the black weight is obtained by converting the K value of the source pixel into a device-independent lightness value.

According to yet another aspect of the invention, in the case that the destination device is a CMYK device, the CMYK values are calculated by first selecting a K value based on the obtained black weight, and then computing the C, M, and Y values based on the selected K value and the color in color appearance space.

According to another aspect of the invention, in the case that the destination device is a CMYK device, C, M, and Y values are computed by interpolation from a CMY to color appearance space LUT, the LUT used having been chosen on the basis of the selected K value.

According to yet another aspect of the invention, a color management system is provided for converting colors from one of a plurality of source device color spaces to a destination color space. The system includes a source device module for calculating a black weight of a source pixel in the source device color space, and for transforming the source pixel into a color in color appearance space. The black weight is calculated based on a black channel in the source color space if the source color space includes a black channel, and is calculated based on color purity if the source color space does not include a black channel. In addition, the system includes a destination device module for calculating CMYK values from the color in color appearance space and the black weight.

According to still another aspect of the invention, the black weight is passed directly from the source device module to the destination device module.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION

The present invention provides a color management system for converting color values from a source device color space to a destination device color space that includes a black (K) channel using black weight information of the source device color value.

The color management system of the present invention is implemented in a computing environment, such as in a color management module (CMM) contained in a device driver or computer operating system. The color management system is typically arranged as executable code stored and a computer-readable memory medium. A CMM utilizes this code to perform color conversion from a source device color space to destination device color space for rendering to a destination device, such as a CMYK printer.

The present invention concerns the conversion of colors from a source device color space to destination device color space that includes a K channel. In particular, the present invention concerns a conversion in which black weight information of the source device is used to select the amount of black used in the destination device. Black weight is calculated for both source devices including a K channel and source devices not including a K channel. By obtaining the black weight of a pixel in the source device color space and utilizing this black weight in the calculation of the destination color value, the present invention effectively uses the black weight in the source color space as a "hint" for the black channel in the destination space, and thus is able to more accurately reflect the amount of black used in the source device in the destination device. Moreover, since black weight is calculated even if the source does not include a black channel, the invention achieves flexibility in accommodating varied source spaces.

Figure 1:
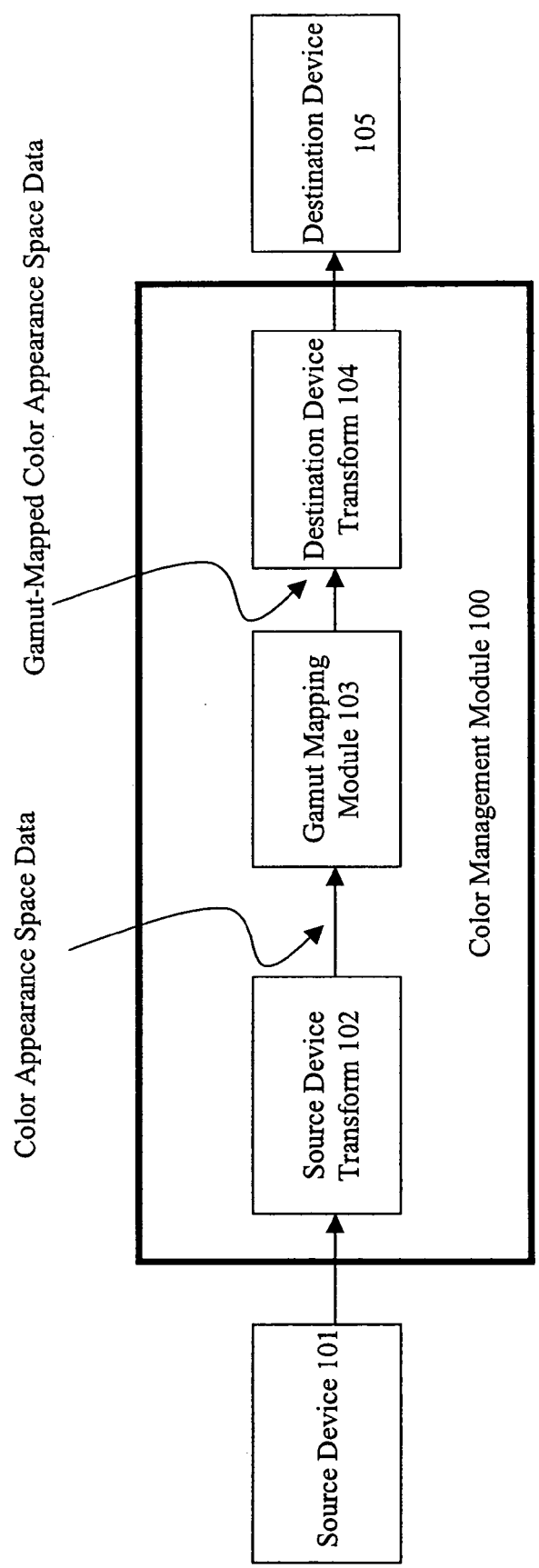
FIG. 1 is a block diagram depicting a conventional color management system.

FIG. 1 depicts a conventional color management system. CMM 100 utilizes source device transform 102 to convert device-dependent color values output by source device 101 into an internal color appearance space. The color appearance space can be implemented in many different formats, including CIELab, CIECAM, and CIELuv. CMM 100 also typically performs color processing operations, such as gamut mapping, on the color data in the color appearance space. For example, gamut-mapping module 103 maps the color appearance space data onto the gamut of destination device 105. This gamut-mapped color appearance space data is then transformed into the destination device color space using destination device transform 104.

Figure 2:
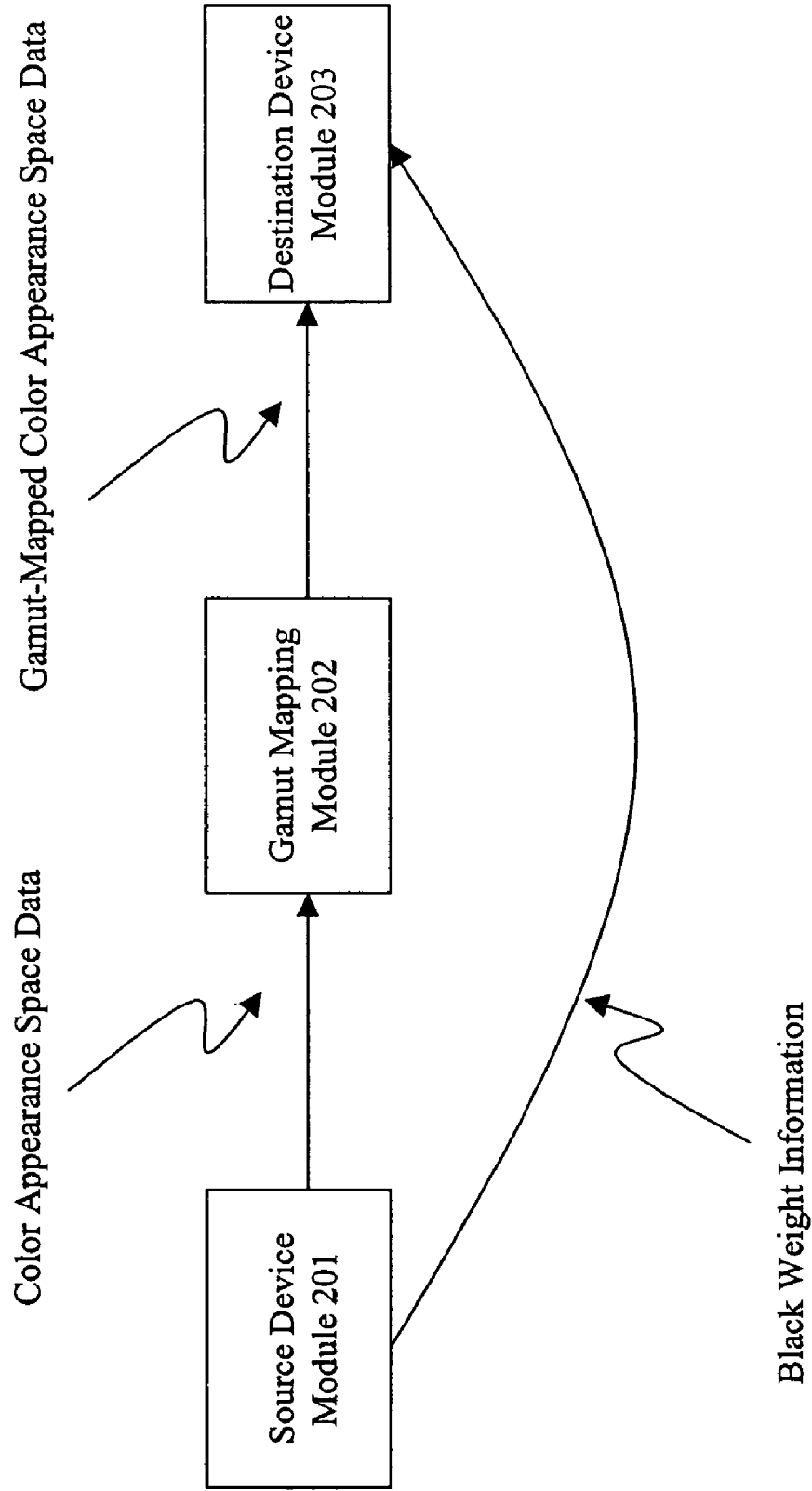
FIG. 2 is a block diagram depicting the color management system of the invention.

FIG. 2 depicts the color management system of one embodiment of the present invention. Source device module 201 converts a color pixel from the source device color space into a color in color appearance space, and this color appearance space data is then mapped to the gamut of the destination device by gamut mapping module 202. Source device module 201 also computes black weight information for each pixel in the source device color space. Black weight can be understood (with some loss of technical accuracy) as the lightness of a color pixel in the black plane.

For source devices that include a K channel, such as a CMYK color space, source device module 201 determines black weight from the amount of black colorant used in the source image and by the physical characteristics of the source device and medium. More specifically, source device module 201 converts the K value of a source pixel into a device-independent lightness value using the source device's color transform. The black weight of a source pixel from a source color space that includes a K channel is essentially the lightness of the source K channel in color appearance space.

For source devices that do not include a K channel, such as a RGB color space, source device module 201 determines black weight from the color purity of a pixel in the source device color space. Color purity of a device colorant space is the distance of the pixel from the device neutral axis. For a trichromatic color space, such as RGB, color purity (CP) may be calculated using the following equation:

$$CP = \frac{HighestValue(RGB) - SmallestValue(RGB)}{HighestValue(RGB)}$$

For example, for a pixel whose color coordinates are RGB= (0.80, 0.10, 0.20), the largest value, R, is 0.80 and the smallest value, G, is 0.10. Hence, color purity, CP, is (0.80−0.10)/

0.80=0.875. This relatively high value for color purity tends to indicate a low amount of black is present in that pixel. To represent this color purity as black weight, color purity is subtracted from 1.

$$BlackWeight = (1-CP)$$

Thus, source device module 201 would compute the black weight of a pixel with RGB values of (0.80, 0.10, 0.20) as 0.125.

Once source device module 201 computes the black weight of the source pixel, the black weight information is passed directly to destination device module 203 "out-of-band". That is, the black weight information skips intermediate modules and/or objects, such as gamut mapping module 202, and is obtained by destination device module 203 directly from source device module 201. One method for providing the black weight information from the source device module 201 to the destination device module 203 directly is to make use of the Component Object Model (COM) system in MICROSOFT® WINDOWS®. Using COM, the destination device module performs a "QueryInterface" call on the source device module to obtain a pointer to an interface to provide the black weight information. Next, the destination device module calls a "GetBlackWeightInformation" method in the interface to get the computed black weight data. It is recommended that the black weight information be represented as an array of floating point numbers, one per picture element or color in the color data being processed. The floating point numbers should range between 0.0 and 1.0, 1.0 representing complete black and 0.0 representing no black.

Once the black weight information is received, destination device module 203 selects a K value for each pixel in the destination device color space based on the black weight information. For example, the destination device module may use the destination device transform to convert the black weight value to a destination color space K value. Then, the destination device module computes the remaining channels for the destination color space (such as CMY for a CMYK space) based on the selected K value and the gamut-mapped color appearance space data. It should be noted that if the destination device module queries for black information and none is received, or if the "QueryInterface" call does not result in an interface for black weight information, conversion to the destination color space proceeds in the conventional manner. In this way, the destination device module of the present invention remains compatible with source device modules that do not compute black weight information, or do not provide a suitable COM interface.

Figure 3:
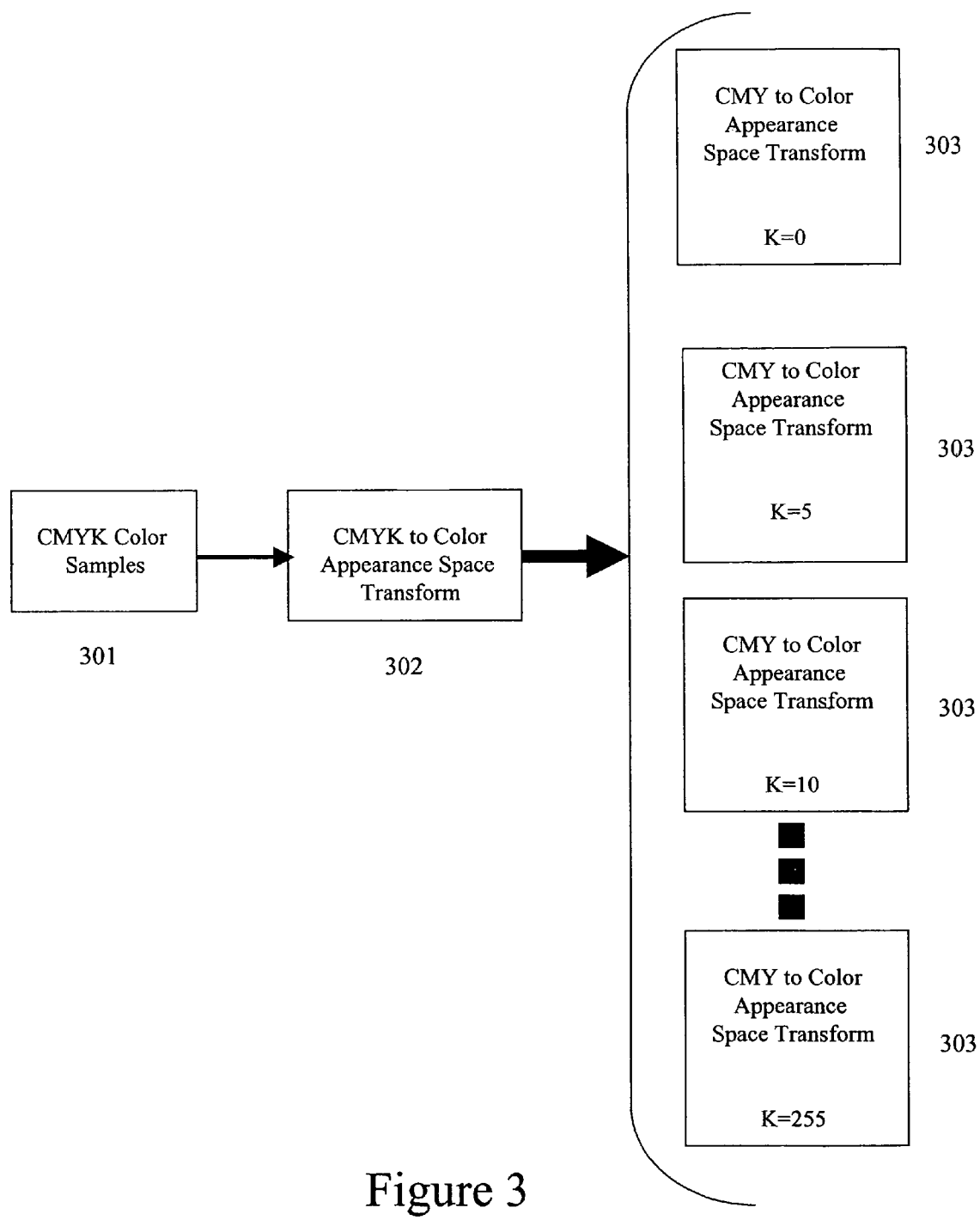
FIG. 3 is a block diagram depicting the creation of plural K-based CMY lookup tables.

The following paragraphs will describe one process for converting the gamut-mapped color appearance space data to destination device color values in the case that the destination device is a CMYK device. The first step in converting the gamut-mapped color appearance space data to CMYK values is the creation of a plurality of three-dimensional (3-D) CMY to color appearance space lookup tables (LUT). Each 3-D LUT is keyed to a constant value of K. FIG. 3 depicts one method of creating the LUTs. CMYK color samples 301 are supplied to CMYK to color appearance space transform 302. Transform 302 is the forward transform (i.e., CMYK to color appearance space) associated with the device for which the color appearance space to CMYK conversion is desired. In effect, running CMYK color samples through transform 302 creates "pseudo color measurements" for the associated CMYK device.

These pseudo-measurements are then placed in the LUT corresponding to the K value of the sample, so as to create plural CMY LUTs 303. With the K value constant, each entry in the LUTs maps a color defined by its CMY color components to a color in color appearance space. In this embodiment, 52 LUTs are created, where the K value of the LUTs range in decimal values of K=0 to K=255 in steps of 5. More or fewer tables could be used, depending on the desired degree of control over the K channel. Along with the associated K value, each LUT also stores the smallest and largest lightness value of the color appearance space values contained therein. For instance, for a CIECAM (Jab) color appearance space, the smallest and largest J value is stored. For a CIELab color appearance space, the smallest and largest L values would be stored.

The method for creating the 52 CMY to color appearance space LUTs depicted by FIG. 3 might be unnecessary, such as a situation where actual color measurements for the desired CMYK device are available. Such actual measurements could simply be grouped into different LUTs based on K value. Again, the smallest and largest lightness values contained in each LUT would also be stored.

Once created, the LUTs can be stored on a fixed disk for future use. Also, the LUTs can be recreated each time they are needed in order to conserve disk space. Of course, there are many acceptable ways of arranging and accessing the LUTs in a storage medium.

Figure 4:
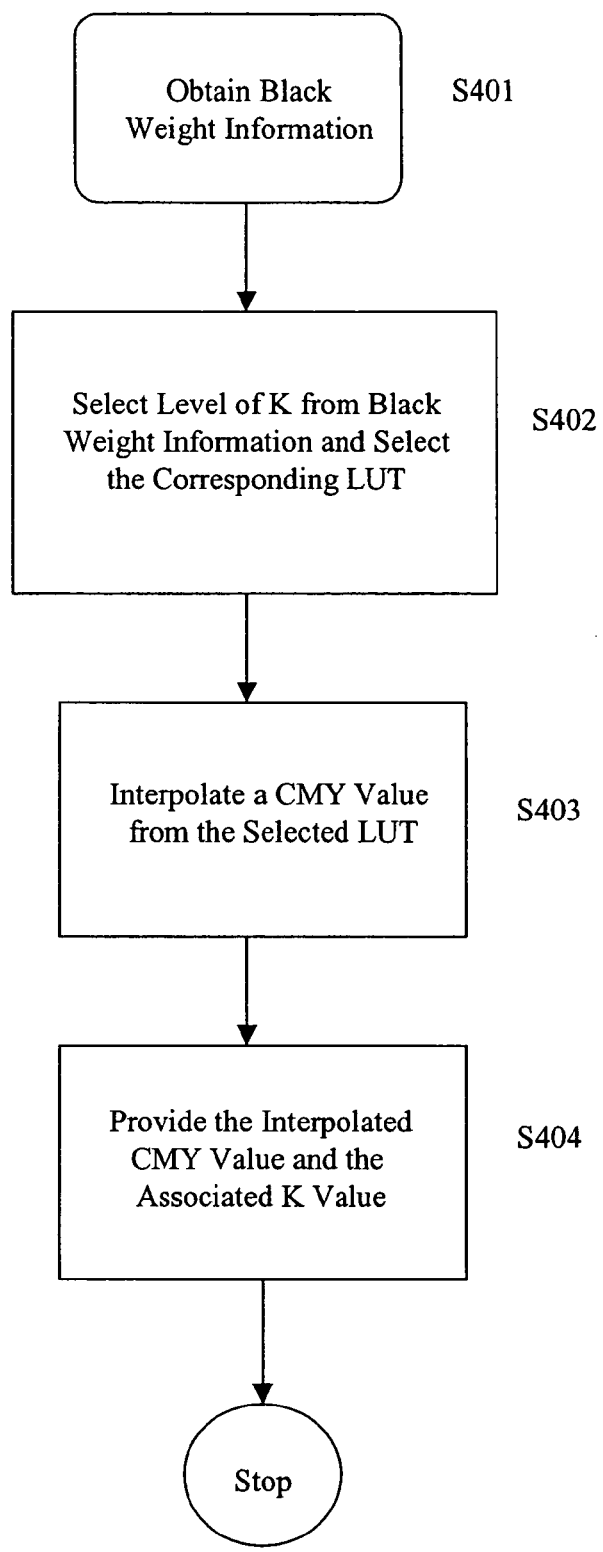
FIG. 4 is a flowchart depicting a process for the conversion of a color appearance space value to a CMYK value.

The three-dimensional CMY to color appearance space LUTs can be inverted to generate the desired conversion. FIG. 4 shows a flowchart depicting this process. The flow sequence shown in FIG. 4 is stored as executable code on a computer-readable memory medium, which is executed by a processor to effect the sequence shown in the figure. Briefly, these steps effect a conversion by first receiving black weight information. Next, one of the plurality of CMY lookup tables is selected based on the black weight information. Finally, a CMYK value is provided based on interpolation from the selected lookup table.

Thus, in S401, black weight information is obtained from the source device module. Next, in S402, a K value is computed based on the black weight information and one of the plural LUTs associated with the computed K value is selected. The black weight information represents the percentage of K desired in the destination device. The black weight information is multiplied by 255 (the maximum value of the range of K in this embodiment) and the LUT whose K value is closest to the product is selected. Thus, the process selects the one of the plurality of lookup tables with a K value percentage that is closest to the black weight. For example, a black weight of 0.55 corresponds to the K=140 LUT as 0.55*255=140.25.

Figure 5:
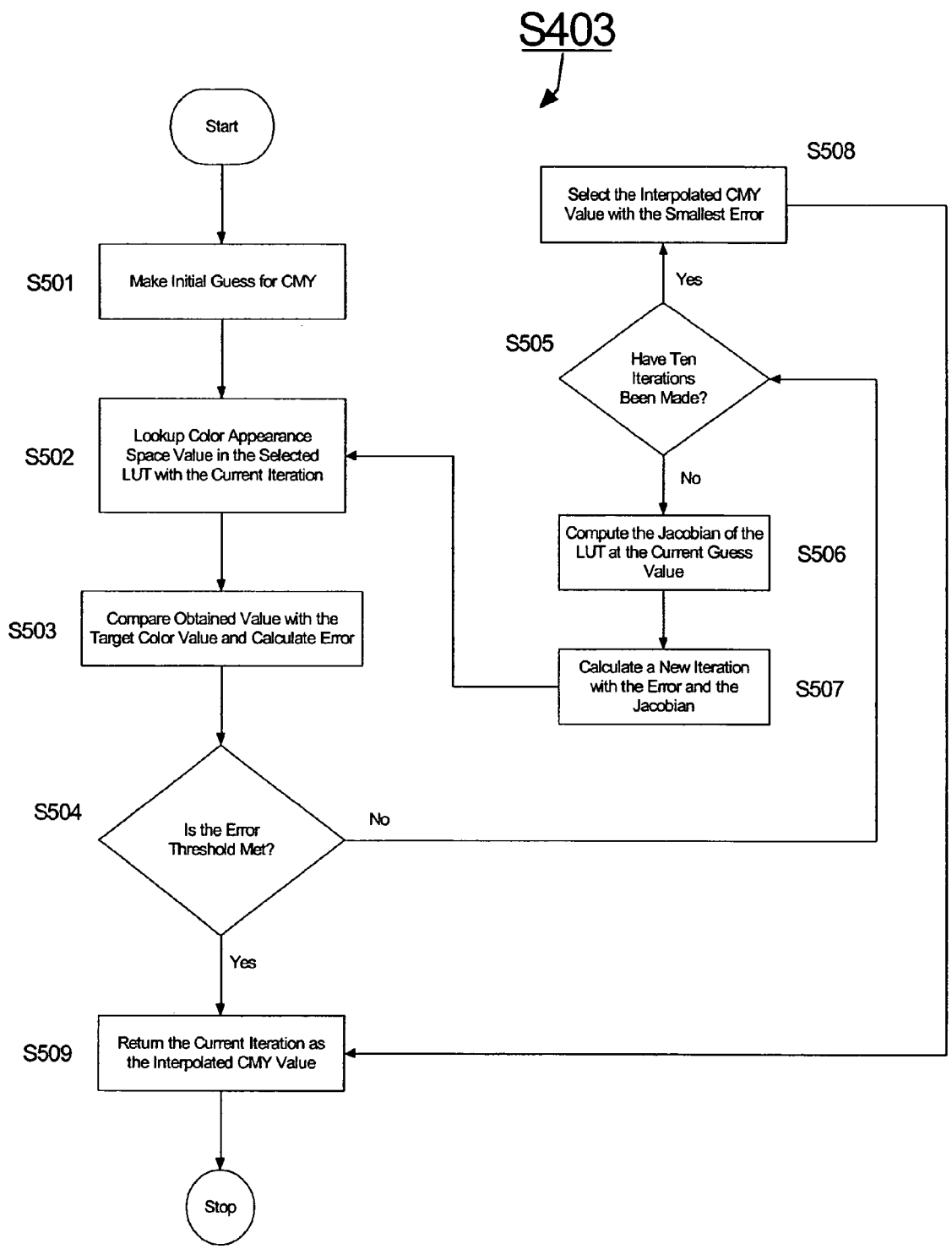
FIG. 5 is a flowchart depicting a process for interpolating a CMYK value from a selected lookup table.

Next, in S403, a CMY value is interpolated from the selected LUT. FIG. 5 depicts this process in more detail. First, in S501, an initial guess for CMY is made. For example, the initial guess for CMY may be (0.3, 0.3, 0.3) where C, M, and Y range from 0.0 to 1.0, and in which this guess is used for all pixels regardless of value. This corresponds to CMY percentages of 30% for each channel.

In S502, the CMY guess (gC, gM, gY) is applied to the selected LUT to obtain the corresponding color appearance space value. For example, if the color appearance space, and therefore the target color value, is in Lab format, the LUT would be a CMY to Lab LUT. Similarly, if the color appearance space is in a Jab format, the LUT would be a CMY to Jab LUT. For a Lab color appearance space, the CMY guess will correspond to a Lab guess value (gL, ga, gb) in the selected LUT. The obtained Lab guess value is then compared to the target color value (tL, ta, tb) in S503, and the error is calculated and stored. The error is defined as the Euclidean distance between the Lab guess value and the target color value In S504, the calculated error is compared to a predetermined error threshold. In a preferred embodiment, the error threshold is equal to 0.001. If the calculated error is less than the predetermined error threshold, the interpolation is considered to be accurate and the process proceeds to S509. Note that the square of the error and the square of the threshold may be used for this calculation. This eliminates the need to compute a square root, thereby improving speed without sacrificing accuracy. In S509, the current guess for CMY is supplied to S404 in FIG. 4, as the interpolated CMY value.

However, if the calculated error is greater than the predetermined error threshold when compared in S504, the process proceeds from S504 to S505. In S505, it is determined if ten iterations have already been made. Note that ten iterations is a preferred number for the iterations. Larger or smaller values can be used, provided that reasonable convergence is achieved. If ten itereations have not yet been made, the process proceeds to S506. In S506, the Jacobian (j), or three-dimensional derivative, of the LUT is calculated at the point of the current iteration of CMY value. In S507, the calculated Jacobian and error are used to calculate a new iteration for CMY value.

The new CMY value is calculated by first computing a Newtonian step delta (d) according to the following equation:

$$(d) = (tL-gL, ta-ga, tb-gb)$$

Next, a Newtonian step is calculated by solving the following equation for x, where j is the calculated Jacobian.

$$j \cdot x = (d)$$

Next, the new CMY value for this iteration is computed by adding x to the previous iteration. The process then returns to S502, and the new CMY value is applied to the currently selected LUT.

If, on the other hand, ten iterations have already been made without meeting the predetermined error threshold, the process proceeds from S505 to S508. At this point, the CMY value with the smallest error is selected from the previous ten iterations. Then, in S509, the current iteration value for CMY is supplied to S404 in FIG. 4, as the interpolated CMY value.

Reverting to FIG. 4, in S404, the interpolated CMY value from S509 and the K value of the currently selected LUT are supplied as the CMYK value. This value is then output for rendering by a CMYK device, such as by printing. The process is repeated for all pixels in the image. Caching of values can be implemented to speed processing in the case of highly repetitive color values in the source image, such as is found in computer graphic images.

The interpolated CMY value can calculated in other ways as well. For example, a range of CMY values may be interpolated from LUTs with K values near the K value of the selected LUT in S403. This range of interpolated CMY values, including the CMY value interpolated from the selected LUT in S403, may be averaged to produce a final interpolated CMY value.

The above process of converting color appearance space values to CMYK values with control on the K channel is described in the context of a color management system. In addition, the present invention can be used to convert color appearance space values to CMYK values as process steps in a printer driver, or in the printer itself.

The invention has been described above with respect to particular illustrative embodiments. It is understood that the invention is not limited to the above-described embodiments and that various changes and modifications may be made by those skilled in the relevant art without departing from the spirit and scope of the invention.

What is claimed is:

1. A color management method for converting source color data in a source device color space that might or might not include a black channel to destination color data in a destination device color space that includes a black channel, the method comprising the steps of:

obtaining a black weight of the source color data in the source device color space, wherein the black weight is obtained by using a black channel of the source color data if the source device color space includes a black channel, and is obtained by using color purity of the source color data if the source device color space does not include a black channel;

transforming the source color data into color data in a device-independent color space;

mapping the color data in the device-independent color space within a color gamut of the destination device;

selecting a LUT from among plural LUTs, wherein each LUT corresponds to a different black channel value, and wherein the selected LUT corresponds to the obtained black weight; and calculating destination color data in the destination device color space that includes a black channel, by using the mapped color data and the selected LUT.

2. The color management method according to claim 1, wherein in the case that the type of the source device color space is a trichromatic color space, the black weight is obtained from a relative purity of the source color data in the trichromatic color space.

3. The color management method according to claim 1, wherein in the case that the type of the source device color space is a device color space including a black channel, the black weight is obtained by converting black channel data of the source color data into device-independent lightness data.

4. The color management method according to claims 2 or 3, wherein the destination color space is CMYK, and wherein the calculating step further includes the steps of:

selecting a K value based on the obtained black weight; and computing the C, M, and Y values based on the selected K value and the color data in device-independent color space.

5. The color management method according to claim 4, wherein the C, M, and Y values are computed by using the selected LUT.

6. The color management method according to claim 1, wherein the destination color data is calculated based on a plurality of the plural LUTs.

7. The color management method according to claim 1, wherein the selected LUT corresponds to a black channel value closest to the obtained black weight.

8. The color management method according to claim 1 wherein in selecting a LUT from among the plural LUTs, the selected LUT corresponds to a black channel value calculated from the obtained black weight.

9. A color management system for converting color data from a source device color space that might or might not include a black channel to a destination device color space that includes a black channel, the system comprising:

a source device module constructed to calculate a black weight of source color data in the source device color space, and constructed to calculate the source color data into color data in a device-independent color space, wherein the black weight is calculated by using a black channel of the source color data if the source device color space includes a black channel, and is calculated by using color purity of the source color data if the source device color space does not include a black channel;

a mapping device module constructed to map the color data in the device-independent color space within a color gamut of the destination device; and a destination device module constructed to obtain the calculated black weight from the source device module and constructed to select a LUT from among plural LUTs, wherein each LUT corresponds to a different black channel value, and wherein the selected LUT corresponds to the obtained black weight;

wherein the destination device module is further constructed to calculate destination color data in the destination device color space, by using the mapped color data and the selected LUT.

10. The color management system according to claim 9, wherein the source device module includes an interface by which the calculated black weight is obtainable from another module, and wherein the black weight is passed from the source device module to the destination device module via the interface.

11. The color management system according to claim 10, wherein in the case that the type of the source device color space is a trichromatic color space, the black weight is obtained from a relative purity of the source color data in the trichromatic color space.

12. The color management system according to claim 10, wherein in the case that the type of the source device color space is a device color space including a black channel, the black weight is obtained by converting black channel data of the source color data into device-independent lightness data.

13. The color management system according to claim 11 or 12, wherein the destination color space is CMYK, and wherein the destination device module calculates the CMYK values by first selecting a K value based on the obtained black weight, and then computing the C, M, and Y values based on the selected K value and the color data in device-independent color space.

14. The color management system according to claim 13, wherein the C, M, and Y values are computed by using a LUT, wherein the selected LUT.

15. The color management system according to claim 9, wherein the destination color data is calculated based on a plurality of the plural LUTs.

16. The color management system according to claim 9, wherein the selected LUT corresponds to a black channel value closest to the obtained black weight.

17. The color management system according to claim 9, wherein in selecting a LUT from among the plural LUTs, the selected LUT corresponds to a black channel value calculated from the obtained black weight.

18. A computer-readable medium which stores computer-executable process steps, the computer-executable process steps for converting source color data in a source device color space that might or might not include a black channel to destination color data in a destination device color space that includes a black channel, the computer-executable process steps comprising:

obtaining a black weight of the source color data in the source device color space, wherein the black weight is obtained by using a black channel of the source color data if the source device color space includes a black channel, and is obtained by using color purity of the source color data if the source device color space does not include a black channel;

transforming the source color data into color data in a device-independent color space;

mapping the color data in the device-independent color space within a color gamut of the destination device;

selecting a LUT from among plural LUTs, wherein each LUT corresponds to a different black channel value, and wherein the selected LUT corresponds to the obtained black weight; and calculating the destination color data in the destination device color space that includes a black channel, by using the mapped color data and the selected LUT.

19. The computer-readable medium according to claim 18, wherein in the case that the type of the source device color space is a trichromatic color space, the black weight is obtained from a relative purity of the source color data in the trichromatic color space.

20. The computer-readable medium according to claim 18, wherein in the case that the type of the source device color space is a device color space including a black channel, the black weight is obtained by converting black channel data of the source color data into device-independent lightness data.

21. The computer-readable medium according to claim 19 or 20, wherein the destination color space is CMYK, and wherein the calculating step further includes the steps of:
selecting a K value based on the obtained black weight; and
computing the C, M, and Y values based on the selected K value and the color data in device-independent color space.

22. The computer-readable medium according to claim 21, wherein the C, M, and Y values are computed by using the selected LUT.

23. The color management system according to claim 18, wherein the destination color data is calculated based on a plurality of the plural LUTs.

24. The computer-readable medium according to claim 18, wherein the selected LUT corresponds to a black channel value closest to the obtained black weight.

25. The computer-readable medium according to claim 18, wherein in selecting a LUT from among the plural LUTs, the selected LUT corresponds to a black channel value calculated from the obtained black weight.

26. A color management system for converting source color data in a source device color space that might or might not include a black channel to destination color data in a destination device color space that includes a black channel, the method comprising the steps of:

a black weight module configured to calculated a black weight of the source color data in the source device color space, wherein the black weight is calculated by using a black channel of the source color data if the source device color space includes a black channel, and is calculated by using color purity of the source color data if the source device color space does not include a black channel;

a transformer configured to transform the source color data into color data in a device-independent color space;

a mapper configured to map the color data in the device-independent color space within a color gamut of the destination device;

a selector configured to select a LUT from among plural LUTs, wherein each LUT corresponds to a different black channel value, and wherein the selected LUT corresponds to the obtained black weight; and a calculator configured to calculate destination color data in the destination device color space that includes a black channel, by using the mapped color data and the selected LUT.

27. The color management system according to claim 26, wherein the destination color data is calculated based on a plurality of the plural LUTs.

28. The color management system according to claim 26, wherein the selected LUT corresponds to a black channel value closest to the obtained black weight.

29. The color management system according to claim 26, wherein in selecting a LUT from among the plural LUTs, the selected LUT corresponds to a black channel value calculated from the obtained black weight.

* * * * *

UNITED STATES PATENT AND TRADEMARK OFFICE
CERTIFICATE OF CORRECTION

| | | |
|---|---|---|
| PATENT NO. | : 7,489,815 B2 | Page 1 of 1 |
| APPLICATION NO. | : 11/039492 | |
| DATED | : February 10, 2009 | |
| INVENTOR(S) | : John S. Haikin et al. | |

It is certified that error appears in the above-identified patent and that said Letters Patent is hereby corrected as shown below:

In column 8, line 54, in Claim 8, delete "claim 1" and insert -- claim 1, --, therefor.

In column 10, line 32, in Claim 23, delete "color management system" and insert -- computer-readable medium --, therefor.

In column 10, line 47, in Claim 26, delete "calculated" and insert -- calculate --, therefor.

Signed and Sealed this
Twenty-eighth Day of June, 2011

David J. Kappos
*Director of the United States Patent and Trademark Office*